United States Patent [19]
Reid

[11] Patent Number: 4,736,641
[45] Date of Patent: Apr. 12, 1988

[54] SELF-SUPPORTING, TRACKLESS, RECTILINEAR LOAD TRANSPORTER

[75] Inventor: James B. Reid, Phoenix, Ariz.

[73] Assignee: John Edward Jennings, Scottsdale, Ariz.

[21] Appl. No.: 1,410

[22] Filed: Jan. 7, 1987

[51] Int. Cl.⁴ .................. F16H 21/44; F05F 11/00
[52] U.S. Cl. ........................ 74/103; 49/324; 248/284
[58] Field of Search .............. 74/103; 248/276, 277, 248/284; 49/324, 360

[56] References Cited

U.S. PATENT DOCUMENTS

| | | | |
|---|---|---|---|
| 2,036,097 | 3/1936 | Pieper | 248/284 |
| 2,734,710 | 2/1956 | Noble | 248/276 |
| 2,900,830 | 8/1959 | Eisenburger et al. | 74/103 |
| 3,211,314 | 10/1965 | Ulinski | 248/284 |
| 3,291,431 | 12/1966 | Daniel | 74/103 |
| 3,426,994 | 2/1969 | Daniel | 74/103 |
| 3,470,981 | 10/1969 | Huxley | 248/277 |
| 3,501,120 | 3/1970 | Daniel | 74/103 |
| 3,782,674 | 1/1974 | Smith | 248/284 |
| 4,437,635 | 3/1984 | Pham | 74/103 |

FOREIGN PATENT DOCUMENTS 260808 8/1965 Australia ............... 248/284

Primary Examiner—Lawrence Staab
Attorney, Agent, or Firm—M. David Shapiro

[57] ABSTRACT

An improved straight line motion gate mechanism which translates gate position to an open/closed position without any perceptible vertical motion and without any moving contact with either the ground or the use of a track. The gate may assume a wide range of widths and the mechanism may be self locking in the closed and open positions. A very small vertical motion of the mechanism provides for minimal input energy requirements and is relatively insensitive to gate weight.

13 Claims, 4 Drawing Sheets

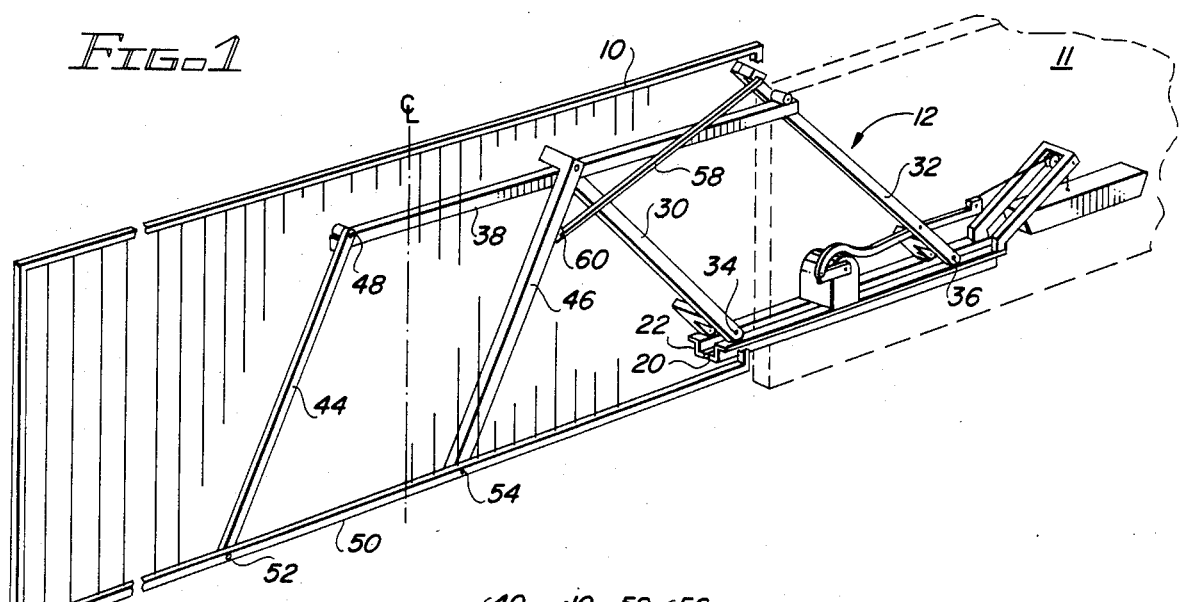

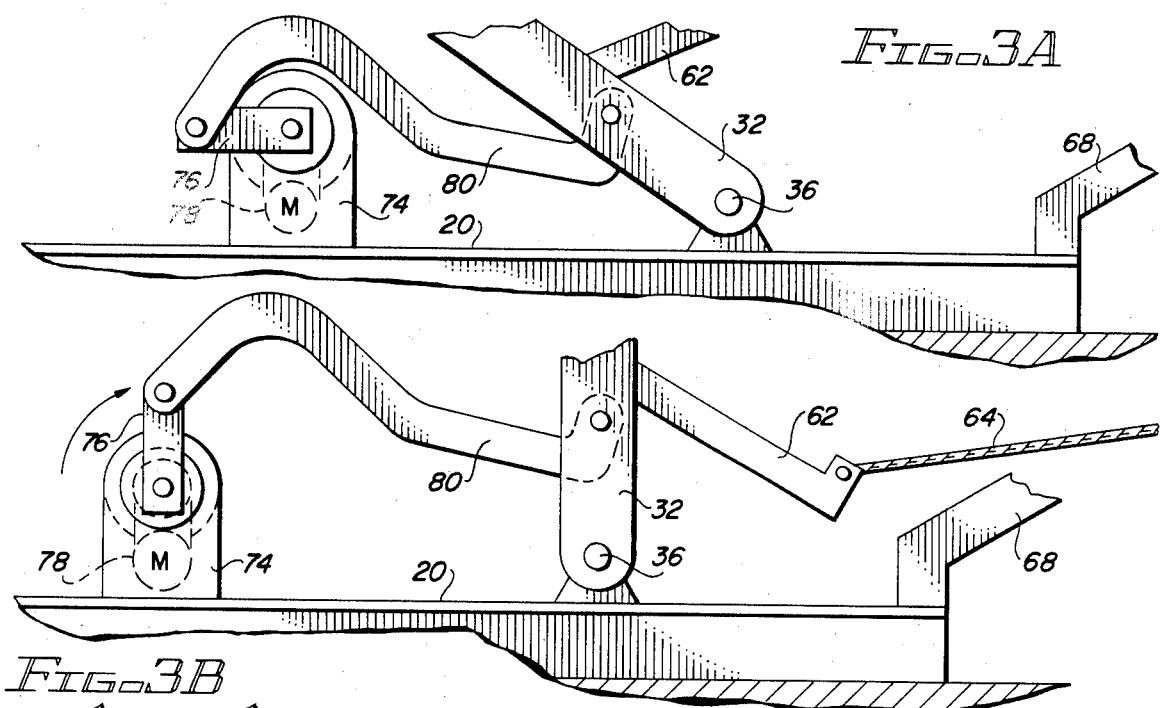
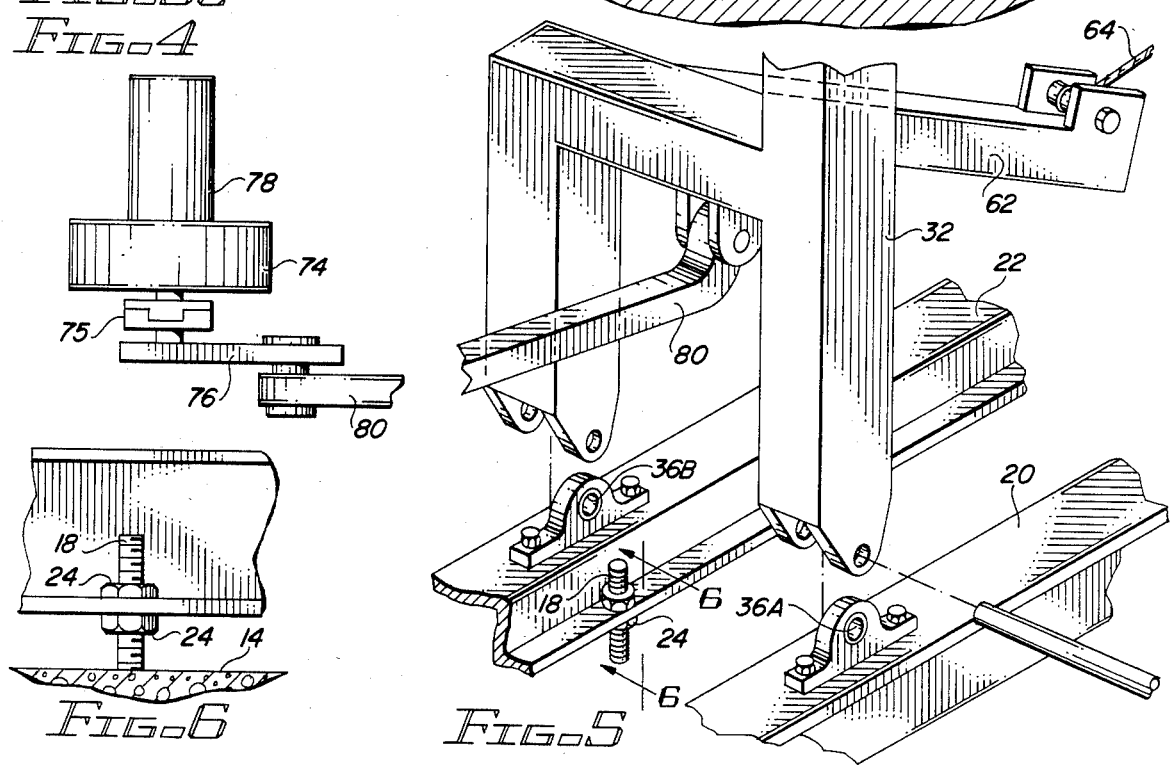

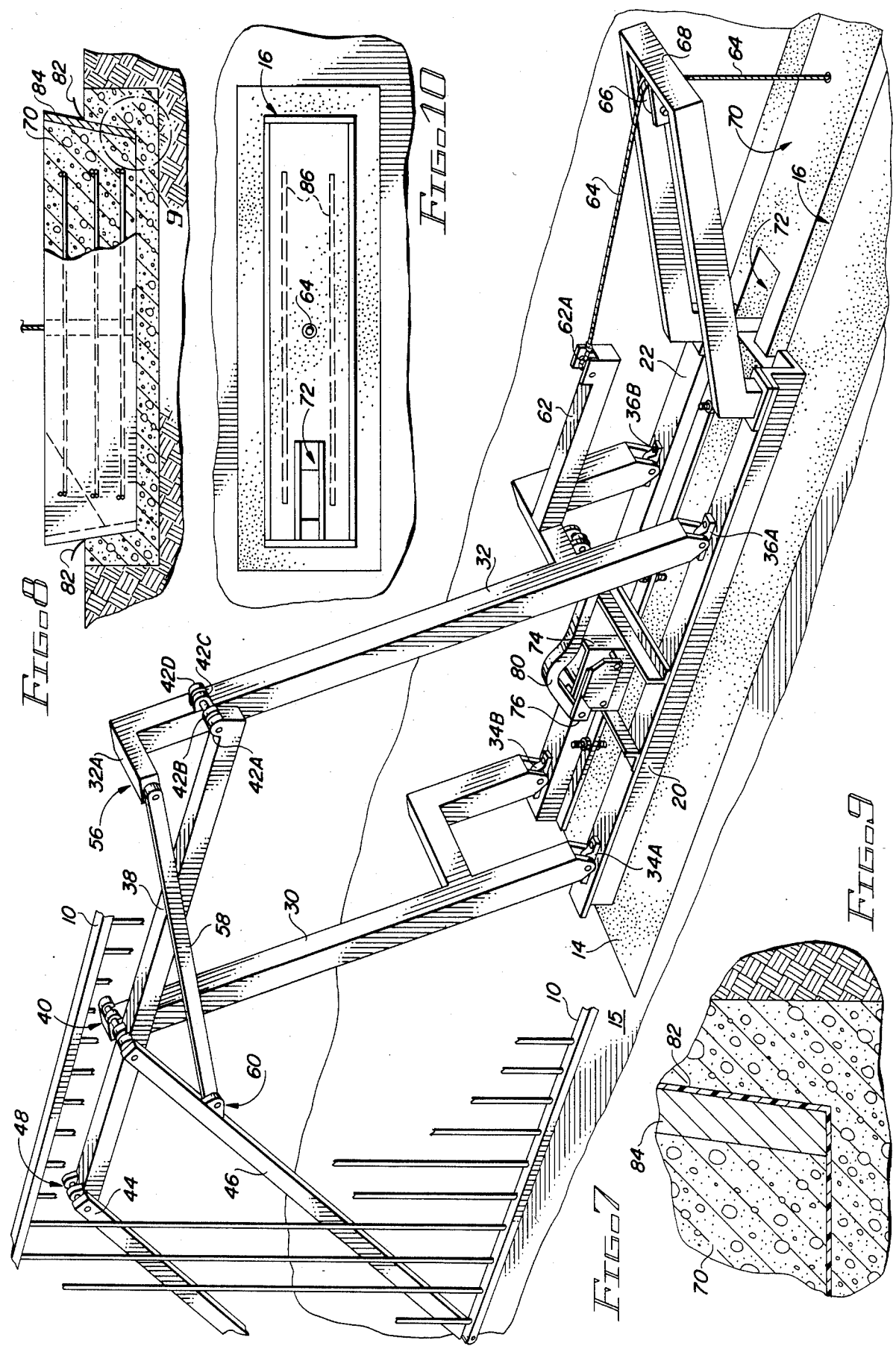

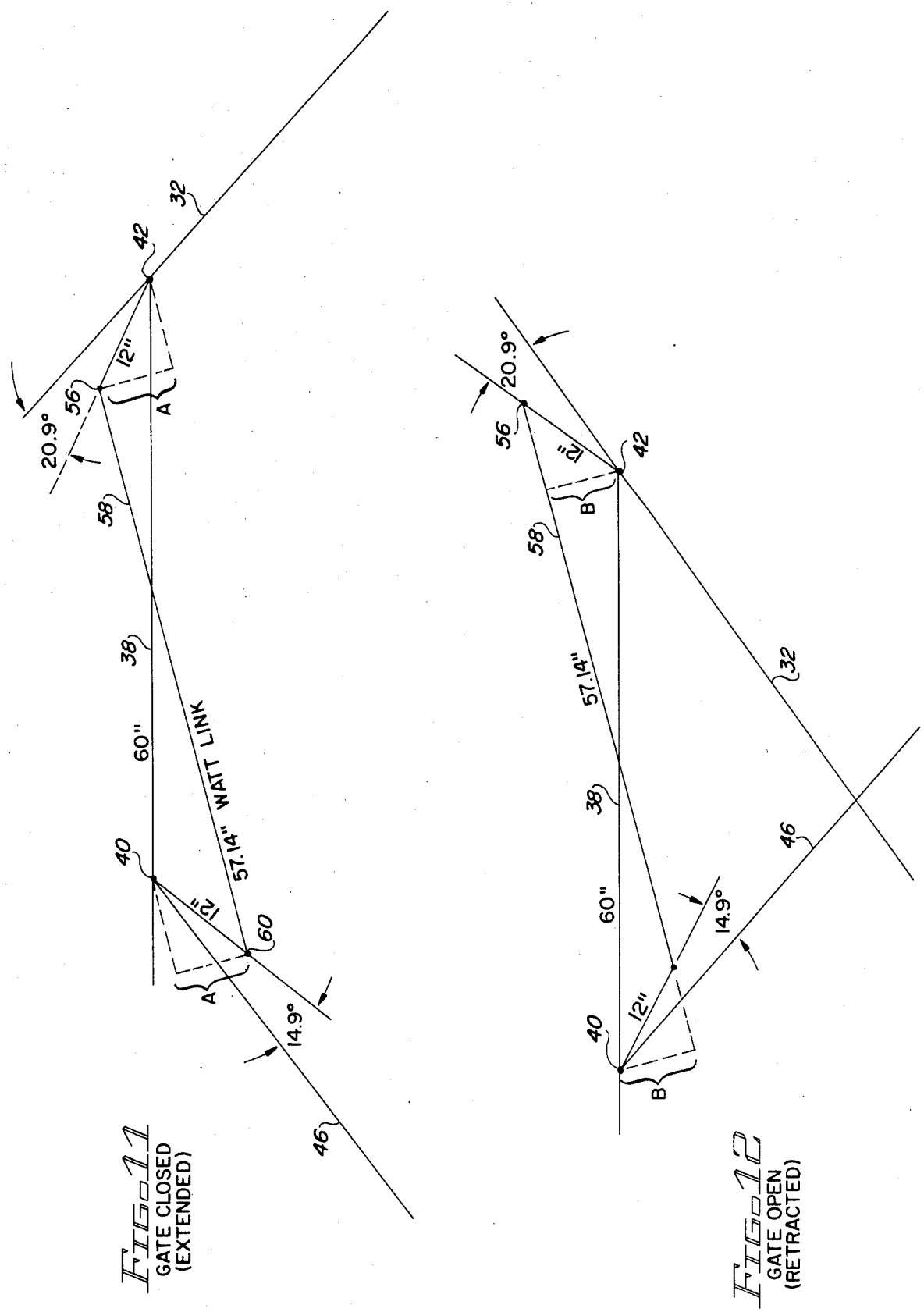

SELF-SUPPORTING, TRACKLESS, RECTILINEAR LOAD TRANSPORTER

FIELD OF THE INVENTION

The invention relates to apparatus for rectilinearly transporting a load, such as a gate, to either of an open or a closed position.

BACKGROUND OF THE INVENTION

There are any number of applications for a self-supporting mechanism which can effectively transport a load along a straight line path from one point to another without substantial deviation from the straight line path, whether vertically or horizontally. For example, pile drivers and rock drilling tools come to mind. Another such application might be in extending a load onto a shelf, such as a fork lift truck might be employed to do.

One such application requires horizontal translation of a security gate for a roadway and/or walkway to an opened and a closed position.

Swinging (hinged) gates are well known and are in common use. My U.S. Pat. No. 4,503,723 for a Gate Operator Apparatus teaches one electrical/mechanical system for opening and closing such a gate. Swinging gates have an inherent disadvantage in that they frequently utilize valuable real estate in the area swept by the opening/closing operation.

In an effort to reduce that real estate requirement, straight line sliding or rolling gates have been utilized. Typically, these gates roll on wheels which either contact the ground, are operated on a track laid on the ground, or on a side or overhead mounted track. While such gates essentially resolve the problem of occupying an excessive amount of real estate, there are other problems associated with their use.

Overhead track systems establish an inherent height limitation for traffic through the gate area. The systems which operate on ground level tracks are subject to damage by the vehicular traffic over the ground laid track, and the wheeled models, which operate on and are supported directly by the ground, are subject to wear and tear on the wheels and on the supporting ground surface. Side mounted tracks may not extend into a protected drive or walkway area since they would then impede foot or vehicular traffic. Therefore, such side mounted track systems must employ a cantilever approach to support the gate over the drive or walkway. Ground level tracks may be rendered inoperable by ice or rocks and are subject to damage by snow-plows and other road maintenance equipment. Ground track systems generally require a hard, level surface for support of the track and it is often necessary to provide a foundation for that surface.

Furthermore, such systems are subject to failure in the structure which is required to provide the gate with upright support and linear travel over a predetermined line of translation. Typically, such support is connected to, and provided from, an adjacent wall or fence which cooperates with the gate in providing security to an enclosed area. Many fences and walls do not have the physical integrity required to provide reliable support for the mechanism of the apparatus. Cantilevered systems require, typically, that approximately fifty percent additional length (30 feet total for a 20 foot gate) be freely available along the adjacent wall or fence for the cantilever mechanism.

Another problem related to poor tracking is the inherent difficulty in making an accurate closing contact with the wall or fence which bounds the gate area. It is somewhat difficult to provide an accurate enough closing contact to assure that the various means for locking the gate will function reliably.

All such gates require some means of linear force for operation. Initially, that was accomplished by means of a person physically operating the gate by pushing on it. This required that a vehicle operator leave his vehicle to operate the gate. That problem has been overcome, typically, by means of a cable or chain drive mechanism operated remotely with an electric motor providing the moving force. Such systems are subject to extreme wear and tear due to exposure to the elements and there are readily apparent safety problems attendant to the use of a cable or chain drive mechanism. Further, such systems are inherently plagued with severe friction forces and relatively large capacity motors must be utilized to energize them. Thus, in case of power failure, it is impractical to provide power to these larger motors from a solar energy source which is inherently restricted in its ability to provide the high power levels required.

It is known to use a counter-weight for the purpose of balancing a load to reduce the input energy requirements for moving that load. Examples of such use include elevators, certain lift bridges, such as the bascule bridge, and movable railroad crossing arms. It is also known to use springs to counterbalance loads for the same purpose as a counter-weight. Springs, of course, provide a variable (non-constant) force, depending upon the degree of compression or expansion.

While the sliding gate problem has been emphasized, supra, it is clear that there are many other applications for linear motion apparatus where it is important or mandatory to keep the traveled load path clear of the apparatus when the load is withdrawn from that path.

SUMMARY OF THE INVENTION

The aforementioned problems and shortcomings associated with prior art, including, without limitation, swinging and linear gates, are overcome in accordance with the instant invention, as more fully described, below. The linear apparatus of the invention utilizes neither overhead nor ground laid track, nor does it require any support from an adjacent wall or fence, nor does it require the load to make any contact with the ground. A twenty foot long gate may be mounted in the twenty linear feet adjacent the gate opening without need for any longer space. A twenty foot gate stows in an open position within twenty feet of lateral space along the adjacent wall with no additional space required. The invention relies on a self-supporting system of two variable angle parallelogram structures (including what is known as a Watt linkage) which operates to transport the load (which may be a gate) in a straight line, and a Watt link is used to couple the two sets of variable angle parallelogram members. (The mechanism is named after the inventor of the steam engine, James Watt, who also invented the linkage.)

Because the apparatus may be fabricated so that the load does not translate vertically (for all practical purposes), but only in an essentially straight line horizontal direction, and because the load is nearly perfectly balanced, there is little or no energy lost in vertical translation. Therefore, a fractional horsepower electric motor may be utilized for the very small required driving force, making it possible to use battery power to continue operation during power outages and where commercial power is not readily available, and solar power to keep the battery charged. The weight of the load has very little effect upon the input power requirement for actuation.

An over-center feature of the operating mechanism provides automatic locking at each end of the horizontal travel of the load. It is also possible to utilize a wide range of load lengths, as required, in the mechanism of the invention.

Therefore, it is an object of the invention to provide a rectilinearly operated load, which may be a gate, which is fully operable from a low power prime mover, such as a fractional horsepower electric motor.

It is another object of the invention to provide a rectilinearly operated load, which may be a gate, which is supported by a linkage from one end and which does not have any moving contact with the ground or any supporting track.

It is still another object of the invention to provide a rectilinearly operated load translation system which can accommodate loads of various lengths without any moving contact with the ground or supporting tracks.

It is yet another object of the invention to provide a rectilinearly operated load mechanism which provides an accurate horizontal load translation without any direct moving contact between the load and the ground or supporting tracks.

It is one more object of the invention to provide a rectilinearly operated load translating apparatus which is adaptable for use over non-flat terrain.

It is still another object of the invention to provide a horizontal translation mechanism for a load which provides essentially no vertical component of load travel.

These and other objects of the invention will become more apparent upon review of the Detailed Description of the Invention taken together with the drawings in which:

FIG. 1 is a perspective view of the gate apparatus of the invention as seen from the non-secure (outside) of the protected compound;

FIG. 2A is a partial frontal view of the gate apparatus of FIG. 1, as it would appear in a closed (extended) position and in the absence of walls, fences, etc.;

FIG. 2B is a partial frontal view of the gate apparatus of FIG. 1, as it would appear in a half-open position and in absence of walls, fences, etc.;

FIG. 2C is a partial frontal view of the gate apparatus of FIG. 1, as it would appear in a full-open position and in the absence of walls, fences, etc.;

FIG. 3A illustrates a portion of the operating drive mechanism of the apparatus of the invention of FIG. 1 in the position it would take when the gate is in a closed position;

FIG. 3B illustrates the portion of the operating drive mechanism shown in FIG. 3A in the position it would take when the is in a half-open position;

FIG. 3C illustrates the portion of the operating drive mechanism shown in FIG. 3A in the position it would take when the is in a full-open position;

FIG. 4 is a partial top view of the drive mechanism of the apparatus of the invention FIG. 1 taken from 4—4 of FIG. 3C;

FIG. 5 is a detailed view of the lower extremity of member 32 of FIGS. 3, showing how the drive mechanism of FIGS. 3 is connected thereto and showing the configuration of member 62 in more detail;

FIG. 6 is a detailed view of the stud mounts of FIG. 5 as viewed from 6—6;

FIG. 7 is a three-quarter view of the base portion of the apparatus of the invention illustrating in more detail a portion of the pivot arrangements of the apparatus;

FIG. 8 is a cross-sectional view of the counterweight 70 of FIG. 7 of the invention;

FIG. 9 is a view taken from FIG. 8 showing the forming method for making the counter-weight of the invention;

FIG. 10 is a top view of the counter-weight of FIG. 8 showing its relationship to the concrete base of the invention;

FIG. 11 is a stick figure of the Watt linkage of the apparatus of the invention of FIG. 1, shown in the gate-closed position; and FIG. 12 is a stick figure of the Watt linkage of the apparatus of the invention of FIG. 1, shown in the gate opened position.

DETAILED DESCRIPTION OF THE PREFERRED EMBODIMENT OF THE INVENTION

The preferred embodiment of the invention is in the form of a rectilinearly operated single panel security gate and it is that preferred embodiment which is illustrated and described herein.

However, it will be understood by one of ordinary skill in the art that there are many other applications for the apparatus of the invention for moving other types of loads in a rectilinear fashion.

(In the description which follows, there are many references to "pivots" or "pivot points." It will be understood that in most cases there are multiple bearings having a common axis in each such pivot or pivot point. For example, pivot 36 at the base of member 32 in FIG. 2, actually comprises two pillow block type bearings 36A and 36B in the configuration shown in more detail in FIG. 5. Pivot 42 (see, FIG. 2) comprises four pillow block type bearings 42A, 42B, 42C and 42D, see the detail in FIG. 7. Other such configurations will become more readily apparent as the reader progresses through the following detailed description.)

The drawing of FIG. 1 is an overall view of the preferred embodiment of the invention as viewed from the outer (non-secure) side of security gate 10. FIG. 1 shows gate 10 in a closed (extended) position. It may be noted that, from the outer (or non-secure) side, the apparatus which operates gate 10 may be hidden from view by an associated wall or fence 11 of the security system. It is practical to hide all of gate 10, and the associated mechanism, when gate 10 is in an open position. There is no track, either overhead or on the ground. There is no wheel or any other rolling or sliding contact with the ground.

FIG. 2A is illustrative of the gate apparatus of the invention in a closed position with the adjacent security walls (or fence) and the apparatus covers omitted in order to better show the details of the apparatus of the invention. Concrete base 14 is poured in a formed trench prepared in the ground 15 for that purpose. The upper surface of base 14 is nominally flush with the surrounding ground. (See, also, FIG. 7.) It is formed with cavity 16 therein to receive counter-weight 70. "Z" shaped beams 20, 22 form an above ground base for the operating mechanism of the gate of the invention. "Z" beams 20, 22 are attached to concrete base 14 by means of threaded stud bolts 18 and adjusting nuts 24, as may be better seen in FIG. 6. Stud bolts 18 (shown in more detail in FIGS. 6 and 7) are embedded in concrete 14 when it is poured and they form an adjustable height anchor for beams 20, 22. Adjusting nuts 24 may be used to level beams 20, 22 so that the mechanism mounted thereon may operate gate 10 rectilinearly (in a straight line), parallel to the horizon and above ground 15.

Counter-weight 70 may be poured in a form created by lining cavity 16 with a plastic film 82 and wood sheathing spacer 84, as shown in FIGS. 8 and 9. Cavity 16 is initially formed with suitable draft so that counter-weight 70 may be more easily retracted from it after curing. Reenforcing rod 86 may be placed in the form for counter-weight 70, as shown in FIG. 10, to assure a higher degree of structural integrity for counter-weight 70.

Of course, one of the advantages of the gate apparatus of the invention is that the ground beneath it need not be perfectly level, or even perfectly flat, as long as gate 10 does not touch the ground while it is in translation. It is desirable to install the gate of the invention so that a lower edge thereof is parallel to the horizon, however, in order to reduce the energy required to move it from a closed to an open position and vice versa. This is accomplished by eliminating, as much as reasonably possible, the vertical motion of gate 10, as will be described, infra.

Observation of FIG. 2A will show that the gate operating mechanism 12 may best be understood by considering members 30 and 32 to be rotating members of a four member parallelogram. Base beams 20, 22 form the bottom member of the parallelogram and are clearly fixed in position. Base beams 20, 22 provide pivot points 34, 36 for the lower extremity of members 30, 32. Upper horizontal beam 38 is pivotally attached to rotatable beams 30, 32 at pivot points 40, 42 and is always parallel to base members 20, 22 because beams 30, 32 are of equal length and the base dimension between pivots 34 and 36 is equal to the distance between pivot points 40 and 42 along upper beam 38. Since the distance between pivots 34, 40 and 36, 42 are equal and the distance between pivots 34, 36 and 40, 42 are also equal, it becomes clear that beams 30, 32 remain parallel to each other and beams 20 (and 22) and 38 remain parallel to each other (by definition, in such a parallelogram). (But, it must be noted that it is the line between the end point pivots of a particular beam that defines the beam for purposes of, in turn, defining the parallel nature of the structural members. It will be seen that such lines are not necessarily coincident with the centerline of any given beam or member.)

A second parallelogram is formed by rotating beams 44, 46 and horizontal beams 50 and the left half of member 38. (It may be noted that beam 50 is a portion of the lowest horizontal member of gate 10 and translates with gate 10 as it is moved from open to closed or vice versa.) Here, again, pivots 52, 54 and 48, 40 are equally spaced and, likewise, pivots 48, 52 and 40, 54 are also equally spaced, providing a similar variable angle parallelogram as in the first case, supra. Since members 20 (and 22) and 38 remain parallel and since members 38 and 50 remain parallel, it is rudimentary that member 50 and 20 (22) also always remain parallel, both being parallel to beam 38. Because of specific offsets from the centerline of the various beams and the precise dimensions of the angles and dimensions set forth herein, beam member 50 also remains essentially in the same horizontal plane as base members 20, 22. As will be seen, there is very little vertical travel in beam member 50 as the system of the invention is operated from a fully closed (see, FIG. 2A) to a fully open (see, FIG. 2C) position and vice versa.

Link 58 connects to member 32 by means of pivot 56 on member 32 at a point above member 38. The other end of link 58 connects pivotally to member 46 at a point below member 38 by means of pivot 60. The distance between pivots 40, 60 and 42, 56 are equal. This kind of a linkage is called a Watt linkage, named after James Watt, the inventor of the steam engine. Link 58 is called a Watt link. The Watt linkage, as utilized in the instant invention acts to translate the rotary motion of member 32 (which, as will be described, infra, is the input member of the system) into a linear motion of member 50. When the dimensions of the members of the two parallelograms are controlled properly, as will also be detailed, infra, member 50 may be made to travel in an essentially straight line path. With the dimensions set out, infra, it has been shown that the vertical motion of member 50, over the full twenty foot gate 10 horizontal travel of the mechanism of the invention, is held to no more than 0.6 inch (about 16 mm), or about 0.25 percent of the horizontal travel.

Watt link 58 is dimensioned and pivoted at its ends so that for a given degree of rotation of input member 32, member 46 rotates through an equal angle in an opposite direction. Member 50 remains parallel to the horizon and does not vary significantly in height from a horizontal datum line.

Gate 10 is connected to member 50 along its bottom edge, or, preferably, member 50 may be the bottom edge of gate 10.

Materials used in fabricating the apparatus of the invention are not critical; any weldable material may be used (assuming that welding is the fastening method of choice, as in the illustrated embodiment of the invention disclosed herein). Box cross-section mild steel was used in the invention as described here. Base members 20, 22 are constructed of two steel angles bolted together to form the "Z" section illustrated in the various drawings (see, FIG. 7, for example). Rotating members 30 and 32 of the first parallelogram are fabricated of 4 inch by five inch rectangular tube having a 0.18 inch wall thickness. The "h" shape legs and projection 32A are fabricated of the same material and are welded thereto. Upper member 38 is also made of the same material.

Rotating member 46 is fabricated of two inch by four inch box steel having a ⅛ inch wall thickness. Rotating member 44 is fabricated of two inch by two inch box steel having a ⅛ inch wall thickness.

Watt link 58 is also fabricated of two inch by two inch square tube having a wall thickness of ⅛ inch.

Axles for all pivot points are 1.00 inch diameter steel cut to suitable length for each application, except that the axles used at pivots 52 and 54 have a 1.437 inch diameter.

The dimensions of the preferred embodiment of the invention, as fabricated and tested, are as follows (where, for example, the term "line 36–42" means the straight line between (and extended beyond) pivot point 36 and pivot point 42. The distances listed are all measured center to center):

Pivot 36 to pivot 42 distance = 80.4 inches
Pivot 34 to pivot 40 distance = 80.4 inches
Pivot 54 to pivot 40 distance = 80.4 inches
Pivot 52 to pivot 48 distance = 80.4 inches
Pivot 34 to pivot 36 distance = 60 inches Pivot 48 to pivot 40 distance=60 inches
Pivot 40 to pivot 42 distance=60 inches
Pivot 56 to pivot 60 distance=57.14 inches
Pivot 42 to pivot 56 distance=12 inches
Pivot 40 to pivot 60 distance=12 inches
Distance between pivot centers on arm 76=9.25 inches
Distance between pivot centers on arm 80=33.25 inches
Sheave 66 diameter=6.0 inches
Distance between "h" legs on member 32=10.0 inches
Distance between "h" legs on member 30=10.0 inches
Angular displacement of line 40-60 from line 40-54=14.9 degrees (CCW)
Angular displacement of line 42-56 from line 36-42=20.9 degrees (CCW)
Gate width=240 inches
Gate height=72 inches
Pivot 36 to pivot 62A at distal end of arm 62=19.2 inches
Weight of counter-weight 70=about 1200 pounds These dimensions, angles and weights provide for a nearly balanced system. Cable 64, its associated linkage and counter-weight 70 act to provide a translation from the linear force provided by counter-weight 70 to the non-linear force which is required to balance the system. The weight of counter-weight 70 may have to be tailored after installation for optimum balance, depending on the weight variables encountered in construction, including variations in the weight of the gate design chosen.

It should be noted that these dimensions and angular displacements provide for Watt link 58 to operate in a manner such that all of its positions throughout an open/close cycle are essentially parallel with respect to every other such position of that link 58; Watt link 58 does not appreciably rotate about a horizontal line perpendicular to its long axis during operation. Furthermore, the moment arms at each end of Watt link 58 remain essentially equal with respect to pivot points 42 and 40, respectively. That is, the perpendicular distance from Watt link 58 (or a straight line extension thereof) to pivot point 40 remains essentially equal to the perpendicular distance from Watt link 58 (or a straight line extension thereof) to pivot point 42 at any given point in the total operating cycle. FIGS. 11 and 12 illustrate the point with "stick" representations of Watt link 58 in the gate-closed (FIG. 11) and gate-open (FIG. 12) positions.

First, FIG. 11 shows that the peculiar geometry chosen for the Watt linkage provides that the perpendicular distances from Watt link 58 to pivot 42 and to pivot 40 are almost exactly equal (references A) at the gate-closed position. Since these perpendicular distances represent the moment arms about pivots 42 and 40 for the torque translation provided through Watt link 58, it may be seen that the torque translation is 1:1; that is, input torque from member 32 to link 58, via pivot 56 is equal to output torque delivered to member 46, via pivot 40 (ignoring friction losses). This is accomplished in the preferred embodiment of the invention by providing a 20.9 degree CCW offset of pivot point 56 with respect to a line drawn between pivots 36 and 42 on member 32 and a 14.9 degree CCW offset of pivot point 60 with respect to a line drawn between pivots 54 and 40, as shown in FIGS. 11 and 12. (See, FIGS. 2 and 7, for more detail as to how this is accomplished.)

Second, the stick representation of FIG. 12 illustrates the geometry with gate 10 full-open. Again, the perpendicular distances from Watt link 58 to each of the pivot points 40 and 56 (shown as references "B") are equal. Furthermore, the distances "B" are essentially equal to the distances "A" shown in FIG. 11. It may be understood intuitively, by one of ordinary skill in this art, that the distances "A" and "B" remain essentially equal throughout the full operating cycle of the apparatus of the invention. Therefore, the torque translation from the first parallelogram to the second remains essentially constant at a 1:1 ratio throughout the operating cycle Third, the 20.9 degree and 14.9 degree offset angles determine, together with Watt link 58 length, the exact value of gate 10 vertical motion. Vertical gate 10 motion directly affects the required input energy requirement from driving motor 78, see FIG. 4 (the energy requirement increases with increased vertical motion of gate 10), and it is desirable, therefore, to minimize such motion.

Accuracy of the above dimensions and angles is mandatory for the specific application. It is suggested that the length of Watt link 58 may be slightly adjusted to get optimum performance of the apparatus. This may be accomplished by shimming pivot 56 on the upper end of link 58 to increase the effective length of link 58. Should link 58 be shorter or longer than the dimensions set out, above (for the embodiment of the invention herein described), it will cause the load (gate 10) to undergo vertical excursions during its horizontal translation. That, in turn, will require more input power than optimum. Because the load (in this case a rectilinearly operated gate 10) does not translate in a vertical direction to any appreciable degree during operation of the apparatus of the preferred embodiment of the invention, there is practically no power consumed for such translation. The friction losses in the system of the invention are minimized by using low friction bearings at all the pivot points. In practice, it has been found that a 1/10 horsepower 12 volt battery operated electric motor 78 driving through gear reduction 74 providing an output of two revolutions per minute is capable of operating a 250 pound twenty foot long gate from extreme to extreme position in less than 15 seconds.

A slip clutch 75 is provided between drive gear 74 and output arm 76 so that whenever excessive resistance to the transportation of gate 10 is encountered, such as when a vehicle, person or animal, or any other thing, interferes with the normal transportation of gate from an open to a closed position, the apparatus of the invention may respond by ceasing its travel prior to doing any serious damage to either the interfering object or to the apparatus of the invention. A clutch such as a Model 25 "Torque-Tamer" which is manufactured by the Dodge Manufacturing Company, Mishawaka, Ind., may be used in this application.

It has also been found that the 12 volt battery so used may be kept adequately charged by means of solar energized photovoltaic cells having a 12 volt, 0.5 ampere charge rating. The "adequate charge," here referred to, allows the sun to be obscured for as much as three days at a time before an external power source is required. The figures are based on 50 full cycles (open/close) per day.

Should the offset angle of pivot point 60 or 56 be found to be incorrect, shims may be used to correct the particular angle to that specified. Should the offset angle of pivot 56 be incorrect, shims placed under the bearings at pivot point 42 on member 32 will effectively increase that angle. Should the offset angle of pivot 60 be incorrect, shims placed under the bearings at pivot 60 on member 46 will effectively increase that angle. These methods of adjustment are preferred since they act independently and do not act to significantly change any other dimensions or angles.

The proximal (left) end of cable arm 62 is attached by welding or by another suitable method to input member 32. Cable 64 is attached to distal end 62A of arm 62. Cable 64 is routed over sheave 66 to concrete counter-weight 70. Bracket 68, mounted on base members 20, 22 serves to position sheave 66 in a location suitable to position counter-weight 70 over recess 16 in concrete base 14.

Counter-weight 70 is equipped with slot 72 in one end thereof so that cable 64 may pass therethrough during the final portion of the opening cycle of gate 10. The purpose of counterweight 70 is to balance the forces on the system so that excessive input force is not required to actuate the apparatus of the invention. Counter-weight 70 acts to pull the gate mechanism back to the half-way position from any other position, providing there is any unbalance in the weights and forces of the total assembly, since at the half-way point cable 64 lies in a straight line between pivot 36 and the top of sheave 66. (See, FIG. 2B.)

However, because of the over-center action of gear box 74 output arm 76 in concert with drive link 80, counter-weight 70 cannot return gate 10 to the center position from the extreme end points. See, infra, for more detail on this locking feature.

Counter-weight 70 is at the lowest point of its travel at the half-way point of operation and is, conversely, higher than that at each extreme of the total travel, although the total travel is less than ten inches. (See, FIGS. 2.) This is true because at the half-way point, distal end 62A of arm 62 is in line with pivot 36 and the top of sheave 66 on the end of bracket assembly 68, which allows counter-weight 70 to reach its lowest position of travel. Therefore, when the gate is positioned at the half-way point (with all rotating members 30, 32, 44 and 46 in a near-vertical position) there is no tendency for the system to move; it is stable. This position is recommended should it be necessary to remove the load (gate 10) from operating mechanism 12 for any reason. A light piece of rope knotted around any two adjacent vertical members is enough to assure that the system is stable because the forces urging motion are neutralized by counter-weight 70.

It is also of interest to note that the apparatus of the invention is arranged so that the maximum force applied to the load (gate 10, in this case) is applied when the load is just beginning to move at the beginning of its travel and when it is just coming to a stop at the end of its designed travel limit. This may be observed in FIG. 3A wherein it may be seen that gear train 74 output arm 76 is almost parallel to the axis of drive link arm 80 when the gear train 74 output shaft is in either extreme position of its approximately 180 degree total travel. This provides maximum output torque since the effective moment length of output arm 80 is nearly zero at these extreme positions. As a result, maximum force at the beginning of the cycle causes maximum acceleration at that time; maximum force at the end of the cycle (a negative force in that instance) causes maximum deceleration. During the middle portion of the cycle, only a minimal applied force is required because of the inertia energy which tends to stabilize the load at maximum velocity. Friction losses help to slow down the load at that point, as well.

It may also be noted that the position of gear output arm 76 with respect to drive link 80 when arm 76 is at the extended (closed) gate extreme, provides for an automatic locking feature. The over-center position, shown in FIG. 3A, makes it nearly impossible to force the gate in the opening direction; it must be driven by the motor 78 and gear drive 74 to open it. The same locking feature is also available in the open position because of the second over-center position at the retracted (extreme open gate) end of the travel of arm 76. The 180 degree action of gear box 74 output arm 76 provides a 90 degree rotation of input member 32 via drive link 80. The particular rotational limits designed into this embodiment of the invention dictate the lengths of members 30, 32, 44 and 46 in the parallelograms of the invention so that the small fractional horsepower motor 78 may operate the gate of the system over the required length in a reasonable time period. It will be clear to one of ordinary skill that other selections may be made for other applications and that there is much room within the scope of the teachings here to provide other combinations of motor sizes, gear head ratios, structural member dimensions, etc.

A housing, not shown, may be employed to keep the elements from the motor 78 and gear housing 74 and to prevent persons or animals from coming into contact with most of the moving parts of the apparatus of the invention.

While the apparatus has been described for use with a twenty foot long gate, it will be apparent that there are at least two ways to shorten such a gate. The most radical approach would entail re-design of the dimensions of the apparatus to tailor it to a new gate length, including reducing the weight of counter-weight 70. But, it is also possible to use an identical apparatus with a shorter gate. The self locking mechanism may be retained by assuring that when the gate is in a closed position, gear 74 output arm 76 is in the fully counter-clockwise position, as shown in FIG. 3A. In other words, the mechanism should be in a fully extended position and the gate should be installed thereon so that it is fully closed. When the mechanism is retracted to open the gate, a limit switch should be installed so that the gate stops at the fully open position (even with the end of wall or fence 11, see, FIG. 1). Alternatively, if there is enough room available behind wall or fence 11 to so operate the apparatus, the gate may be fully retracted as though the gate were the full twenty feet in length. It will be readily apparent that similar approaches may be taken with loads other than gates which may have different lengths.

It will also be readily apparent that nearly any rectilinear motion for nearly any load type may be accommodated by re-dimensioning the members of the apparatus to suit the particular requirements.

While the invention is particularly shown and described herein with reference to preferred and other embodiments thereof, it will be understood by those skilled in the art that various modifications and changes may be made to the instant invention utilizing the principles of the invention as described herein without departing from the spirit and scope thereof as encompassed in the accompanying claims. Therefore, it is intended in the accompanying claims to cover all such equivalent variations as may come within the scope of the invention as described herein.

What is claimed is:

1. An improved apparatus for transferring a load in a rectilinear manner above a predetermined surface, comprising in combination:

a support base, said support base being connected to and supported by the predetermined surface;

at least one load;

means for linearly transporting said at least one load to each of a retracted and an extended position, said retracted position being on a first side of said support base, said extended position being on a second side of said support base, said means for linearly transporting being pivotally attached to said support base and said means for linearly transporting being pivotally attached to said at least one load, said at least one load having no sliding or rolling contact with the predetermined surface;

said means for linearly transporting further comprising:

a first plurality of members forming a first variable angle parallelogram;

a second plurality of members forming a second variable angle parallelogram;

a common horizontal beam member, said common horizontal beam member comprising an upper member of each of said first and said second variable angle parallelograms, and wherein four corners of said parallelograms are upper conrers of said parallelograms, and said four upper corners lie on a straight line; and a Watt link, said Watt link being a single member pivotably connected to one member of one of said first and said second plurality of members at a point above said straight line and said Watt link being pivotably connected to another member of another of said first and second plurality of members below said straight line, whereby said Watt link is so connected as to cause said one member and said another member to rotate in opposite directions when either of said one and said another member is urged to rotate.

2. The apparatus according to claim 1 wherein said at least one load traverses a predetermined horizontal distance and said means for linearly transporting further comprises:

means for limiting a vertical motion of said at least one load to no more than 0.25 percent of said predetermined horizontal distance.

3. The apparatus according to claim 2 wherein said predetermined horizontal distance is at least twenty lineal feet and said vertical motion over said twenty lineal feet of predetermined horizontal distance is no more than six-tenths of one inch.

4. The improved apparatus according to claim 1 wherein said one member is pivotably connected as a member of one of said first and second variable angle parallelograms, and said another member is pivotably connected as a member of another of said first and second parallelograms, each of said one and said another members being pivotably connected into one of said first and second variable angle parallelograms by means of a pair of pivots, each of said pair of pivots defining a straight line, each of said Watt link pivot connections being offset from one of said straight lines by a predetermined amount whereby a driving torque applied to a first end of said Watt link is essentially the same as a torque delivered from a second end of said Watt link.

5. The improved apparatus according to claim 1 further comprising:

counter-weight means for balancing said means for linearly transporting said at least one load, said counter weight means being coupled to a member of said means for linearly transporting said at least one load.

6. The improved apparatus according to claim 2 further comprising:

counter-weight means for balancing said means for linearly transporting said at least one load, said counter weight means being coupled to a rotatable member of said means for linearly transporting said at least one load.

7. The improved apparatus according to claim 3 further comprising:

counter-weight means for balancing said means for linearly transporting said at least one load, said counterweight means being coupled to a rotatable member of said means for linearly transporting said at least one load.

8. The improved apparatus according to claim 4 further comprising:

counter-weight means for balancing said means for linearly transporting said at least one load, said counterweight means being coupled to a rotatable member of said means for linearly transporting said at least one load.

9. The apparatus according to claim 1 further comprising:

means for driving said means for linearly transporting said at least one load, said means for driving further comprising means for preventing an extension or retraction of said means for linearly transporting when said means for driving is not operated.

10. The apparatus according to claim 2 further comprising:

means for driving said means for linearly transporting said at least one load, said means for driving further comprising means for preventing an extension or retraction of said means for linearly transporting when said means for driving is not operated.

11. The apparatus according to claim 3 further comprising:

means for driving said means for linearly transporting said at least one load, said means for driving further comprising means for preventing an extension or retraction of said means for linearly transporting when said means for driving is not operated.

12. The apparatus according to claim 4 further comprising:

means for driving said means for linearly transporting said at least one load, said means for driving further comprising means for preventing an extension or retraction of said means for linearly transporting when said means for driving is not operated.

13. The apparatus according to claim 5 further comprising:

means for driving said means for linearly transporting said at least one load, said means for driving further comprising means for preventing an extension or retraction of said means for linearly transporting when said means for driving is not operated.

* * * * *